United States Patent [19]

Ito

[11] Patent Number: 4,580,177
[45] Date of Patent: Apr. 1, 1986

[54] SWITCHING CIRCUIT FOR AC BIAS SIGNAL

[75] Inventor: Hideaki Ito, Kawasaki, Japan

[73] Assignee: Tokyo Shibaura Denki Kabushiki Kaisha, Japan

[21] Appl. No.: 586,730

[22] Filed: Mar. 6, 1984

[30] Foreign Application Priority Data

Mar. 8, 1983 [JP] Japan .................................. 58-36696

[51] Int. Cl.⁴ ......................... G11B 15/12; G11B 5/02
[52] U.S. Cl. ......................................... 360/62; 360/68
[58] Field of Search ............... 360/62, 66, 68; 331/74, 331/185

[56] References Cited

U.S. PATENT DOCUMENTS 4,342,006 7/1982 Ishigaki .................................. 360/68
4,510,459 4/1985 Guisinger .............................. 360/80

Primary Examiner—Vincent P. Canney
Attorney, Agent, or Firm—Finnegan, Henderson, Farabow, Garrett & Dunner

[57] ABSTRACT

A switching circuit for AC bias signal has an input terminal for inputting an input signal into the switching circuit and a first transistor connected to the emitter of the input terminal. A second transistor is connected at the collector to the collector of the first transistor. The emitter area of the second transistor is larger than that of the first transistor so that the dynamic resistances of the these transistors are equal to each other when these resistors are ON state. The emitter of the second transistor is connected to the reference voltage terminal supplied with ground voltage. The first and second transistors are controlled in conduction by a control signal as input.

3 Claims, 5 Drawing Figures

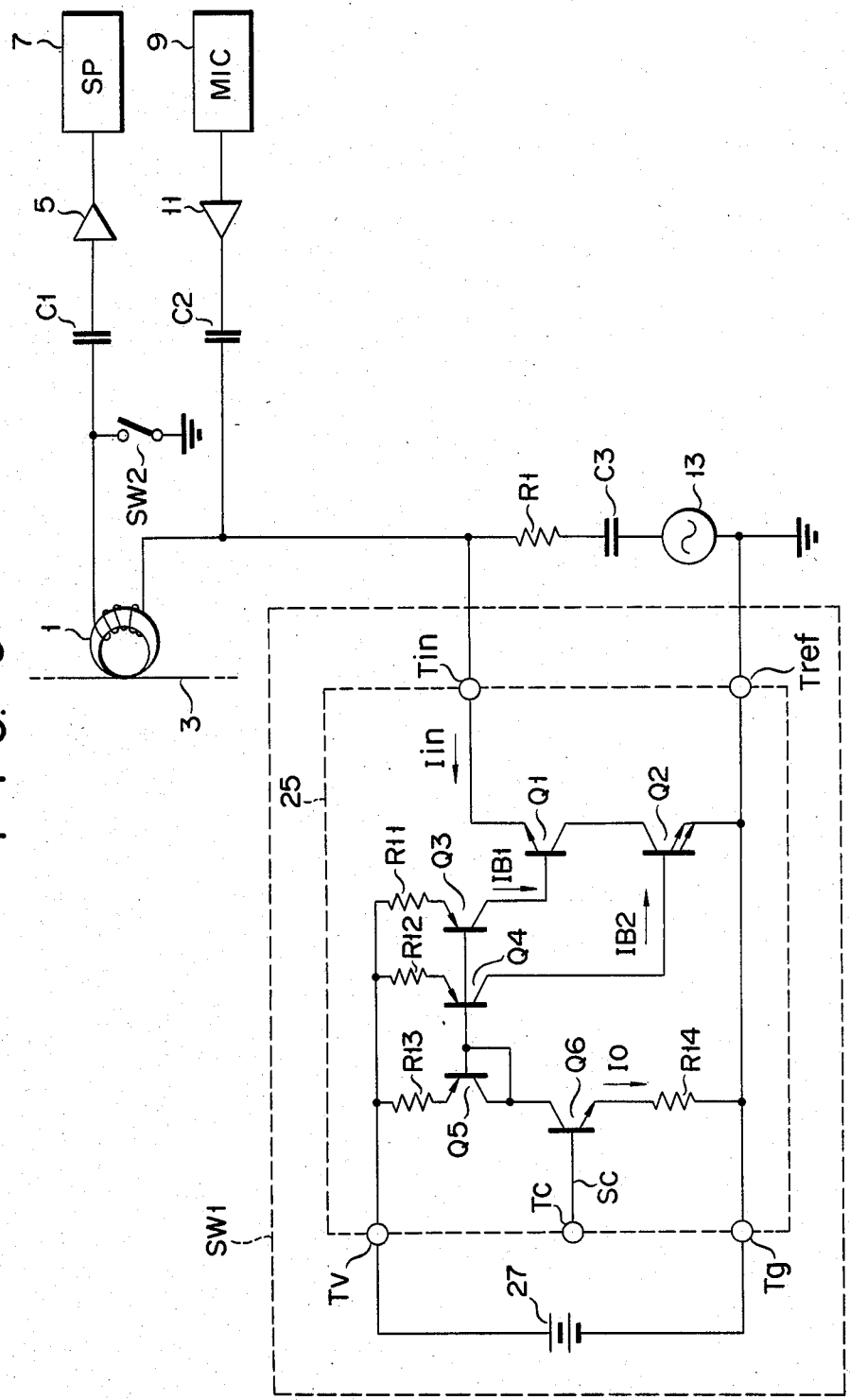
F I G. 5

SWITCHING CIRCUIT FOR AC BIAS SIGNAL

BACKGROUND OF THE INVENTION

The present invention relates to a circuit suitable for ICs used in VIRs and audio equipment, and more particularly to a switching circuit for AC bias signal.

The conventional record/playback circuit in a tape recorder is known as shown in FIG. 1. In this circuit, including a couple of switching circuits, the playback mode will be first described. One switching circuit SW1 is ON, while the other switching circuit SW2 if OFF. A magnetic head 1 picks up a signal recorded on a magnetic tape 3 to produce a playback signal. The playback signal is input to a playback preamplifier 5, via a coupling capacitor C1. The preamplifier 5 amplifies the playback signal to a level strong enough to drive a loudspeaker. Since the positive and negative peak voltages of the playback signal are several mV, a large withstand voltage is not required in the design for a switching circuit SW2. In the record mode, the switching circuit SW1 is OFF, while the switching circuit SW2 is ON. A recording signal is input from a microphone into the record/playback circuit passes through a recording amplifier 11 and a coupling capacitor C1, to the magnetic head 1. The recording signal is superposed with an AC bias signal output through a capacitor C3 and a resistor R1, and the superposed signal is applied to the magnetic head 1. The bias signal has positive voltage of 50 V and negative peak voltages of −50 V. Accordingly, a 50 V peak voltage and a −50 V peak voltage are alternately applied to the switching circuit SW1 when it is OFF. For this reason, the switching circuit SW1 must be designed so as to withstand the peak to peak voltage of 100 V or more, otherwise, the recording signal is distorted.

The switching circuit SW1 arranged using a discrete component is shown in FIG. 2. As shown, the collector of a transistor 15 is connected to an input terminal Tin. The emitter of the transistor 15 is connected to the emitter of a transistor 17. The collector of the transistor 17 is connected to a reference voltage terminal Tref. The ground potential is normally applied to the reference voltage terminal Tref. For controlling the switching operation, a control signal S is applied to the bases of the transistors 15 and 17. When the switching circuit of FIG. 2 is fabricated into an integrated circuit, parasitic diodes D1 and D2 are inevitable formed between the collectors of the transistors 15 and 17, and the substrate, as shown in FIG. 3. For increasing the withstand voltage of the switching circuit SW1 to a larger value, it is ideal to electrically open the substrate. However, the semiconductor substrate is not generally used in an open state. When a signal applied to the input terminal Tin is negative value, the voltage of the signal is clamped at a value of the forward voltage of the parasitic diode D1 lower than the voltage of the semiconductor substrate. For the above reasons, it is very difficult to fabricate the switching circuit of FIG. 2 into an integrated circuit. The general integrated switching circuit is shown in FIG. 4. As shown, the collector of a transistor 19 is connected to the input terminal Tin, and the emitter thereof is connected to the reference voltage terminal Tref. The collector of the transistor 21 is coupled with the base of the transistor 19. The emitter of the transistor 21 is connected to the semiconductor substrate. For controlling the switching operation, a control signal S is applied to the base of the transistor 21. In the arrangement shown in FIG. 4, the voltage Vsub of the semiconductor substrate must be lower than the voltage $V_{Tref}$ at the reference voltage terminal Tref. If the base-emitter voltage of the transistor 19 is $V_{BE(19)}$, and the collector-emitter saturation voltage of the transistor 21 is $V_{CE(sat)(21)}$, these voltages must satisfy the following relations.

$$V_{Tref} > V_{sub} + V_{BE(19)} + V_{CE(sat)(21)} \quad (1)$$

Accordingly, for setting the reference voltage terminal Tref of the switching circuit shown in FIG. 4 at ground level, the voltage of the semiconductor substrate must be set negative value. This necessitates two power sources. One of them generates positive voltage and the other of them generates negative voltage. When an offset voltage is applied to the reference voltage terminal Tref for setting the substrate voltage to ground level, a power source for offset voltage is additionally needed. Further, when the switching circuit, where the reference voltage terminal Tref is set at the offset voltage, is used as the switching circuit SW1 in FIG. 1, DC voltage is always applied to the magnetic head 1. So the magnetic head 1 is subject to electrolytic corrosion.

SUMMARY OF THE INVENTION

Accordingly, an object of the present invention is to provide a switching circuit for AC bias signal, which is operable by a single power source and which is structurally suitable for an integrated fabrication.

To achieve the above object, there is provided a switching circuit for AC bias signal comprising: an input terminal applied with an input signal; a first transistor connected at the emitter to the input terminal; a second transistor connected at the collector to the collector of the first transistor and having an emitter area larger than that of the first transistor so that a dynamic resistance is substantially equal to that of the first transistor when the first and second transitors are ON state; a reference voltage terminal connected to the emitter of the second transistor and applied with a reference voltage; a control signal inputting means for inputting a control signal; a base current feeding means for feeding a base current to the bases of the first and second transistors according to the control signal input by said inputting means.

The above arrangement provides many advantages. The switching circuit for AC bias signal of the present invention thus arranged can be easily fabricated into an integrated circuit. The switching circuit for AC bias signal of the present invention can be driven by a single power source. The reference voltage can be set at ground voltage. As a result, a higher withstand voltage is obtained against the positive and negative voltages. The minimum element area attained may provide the necessary low dynamic resistance and the high withstand voltage, leading to a significant reduction in the size of the ICs and to an increase in integration density.

BRIEF DESCRIPTION OF THE DRAWINGS

FIG. 5 is a circuit diagram of a tape recorder into which a switching circuit for AC bias signal according to the present invention is assembled.

DETAILED DESCRIPTION OF THE INVENTION

Description of Circuit Arrangement

Figure 1:
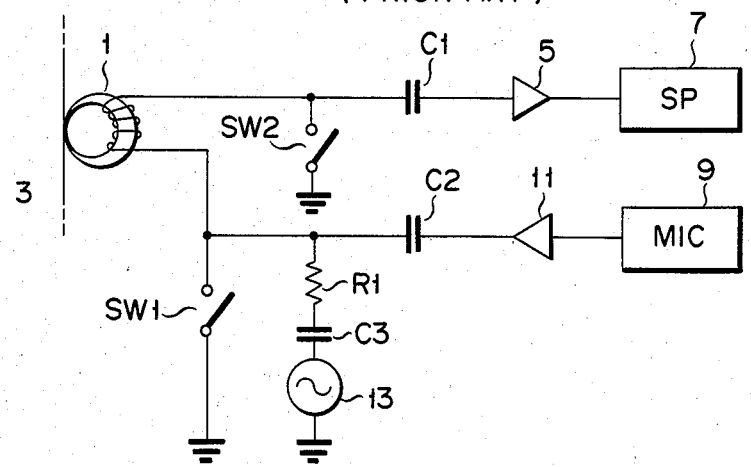
FIG. 1 is a circuit diagram of a record/playback circuit in a tape recorder.
Figure 2:
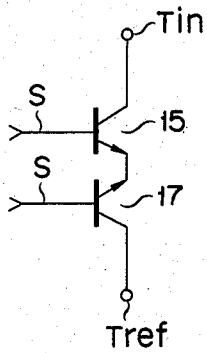
FIG. 2 is a circuit diagram of a prior switching circuit formed by discrete components.
Figure 3:
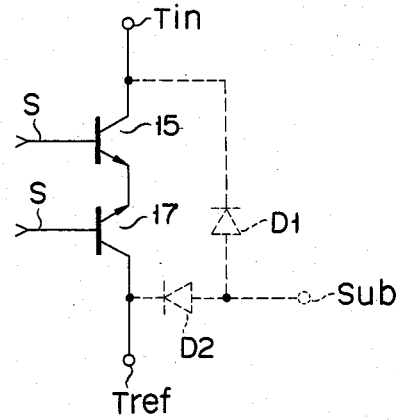
FIG. 3 is an equivalent circuit of the switching circuit of FIG. 2 when it is integrated.
Figure 4:
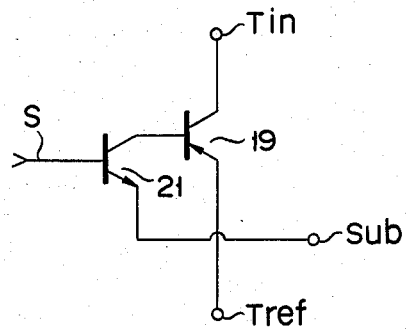
FIG. 4 is a circuit of a prior switching circuit fabricated into an integrated circuit.

An embodiment of a switching circuit for AC bias signal according to the present invention will be described in detail referring to FIG. 5. The switching circuit according to the present invention is applied to a switch SW1 located in a record/playback circuit of a tape recorder as shown in the same reference numerals as used in FIG. 1 denote the same parts in FIG. 5. In FIG. 5, the emitter of a first transistor Q1 is connected to the input terminal Tin. The collector of a second transistor Q2 is connected to the collector of the first transistor Q1. The emitter of the second transistor Q2 is coupled with the reference voltage terminal Tref. The emitter of the second transistor Q2 has an emitter area two times that of the first transistor Q1. The base of the first transistor Q1 is connected to the collector of a third transistor Q3. The emitter of the third transistor Q3 is connected to a power source terminal Tv via a first resistor R11. The base of the second transistor Q2 is connected to the collector of a fourth transistor Q4. The emitter of the fourth transistor Q4 is connected to the power source terminal Tv via a second resistor R12. The bases of the third transistor Q3 and the fourth transistor Q4 are connected to the base and the collector of a fifth transistor Q5, and the collector of a sixth transistor Q6. The emitter of the fifth transistor Q5 is connected to the power source terminal Tv by way of a third resistor R13. The base of the sixth transistor Q6 is coupled with a control signal input terminal Tc. The emitter of the sixth transistor Q6 is connected to the reference voltage terminal Tref via a fourth resistor R14. In the circuit arrangement of FIG. 5, a portion enclosed by a broken line 25 is fabricated into an integrated circuit. An external power source 27 applies voltage Vcc between the power source terminal Tv and a ground terminal Tg which connects to the reference voltage terminal Tref in the IC package. A ground level voltage is applied to the reference voltage terminal Tref.

The operation of the circuit arrangement of FIG. 5 will now be described.

In the FIG. 5 arrangement, the switching circuit SW1 is turned off in the record mode of the tape recorder, as already stated. To this end, an L level (logical low level) control signal S is applied to the control signal input terminal Tc of the switching circuit SW1. The L level control signal S reaches the base of the sixth transistor Q6 to turn off the sixth transistor Q6. The result is that no current flows through the bases of the third, fourth and fifth transistors Q3, Q4 and Q5, and those transistors are turned off. Further, no base current flows in the first and second transistors Q1 and Q2, and so these first and second transistors Q1 and Q2 are also turned off. Thus, the switching circuit SW1 is turned off. Under this condition, when a positive voltage is applied to the input terminal Tin, the withstand voltage of the switching circuit SW1 depends on the withstand voltages across the collector-base of the second transistor Q2, across the base-emitter of the first, second and third transistors Q1, Q2 and Q3, and across the collector-base of the sixth transistor Q6. On the other hand, when a negative voltage is applied to the input terminal Tin, the withstand voltage of the switching circuit SW1 depends on the withstand voltages of the collector-base across the transistor Q1 and across the base-emitter of the third transistor Q3.

In a playback mode, an H level (high logical level) control signal S is applied to the control signal input terminal Tc in order to turn off the switching circuit SW1. By the H level control signal S appearing at the base of the sixth transistor Q6, the sixth transistor Q6 is turned on. Then, the currents flows through the bases of the third, fourth and fifth transistors Q3, Q4 and Q5 to turn on these transistors. The third transistor Q3 turns on. So a base current $I_{B1}$ is supplied through the third transistor Q3 and the resistor 11 to the base of the first transistor Q1, resulting in the turning on of the first transistor Q1. A base current $I_{B2}$ is supplied to the base of the second transistor Q2, through the resistor R12 and the fourth transistor Q4, resulting in the turning on of the second transistor Q2.

The base currents $I_{B1}$ and $I_{B2}$ are approximately expressed by the following equations $$I_{B1} = I_O \frac{R11}{R13} \quad (2)$$

$$I_{B2} = I_O \frac{R12}{R13} \quad (3)$$

$$I_O = \frac{V_H - V_{EB(Q6)}}{R14} \quad (4)$$

where $V_H$ is voltage of H level control signal input to the control signal input terminal Tc; $V_{EB(Q6)}$ is an emitter-base voltage of the sixth transistor Q6; R14 is the resistance of the fourth resistor R14; and $I_O$ is a current flowing through the resistor R14. When the first and second transistors Q1 and Q2 are turned on, the input terminal Tin is grounded. In this way, the switching circuit SW1 is turned off.

The dynamic resistance between the input terminal Tin and the reference voltage terminal Tref is the sum of the saturation impedance of the first transistor Q1 in a inverse mode, and the saturation impedance of the second transistor Q2 in a forward mode, when a positive voltage is applied to the input terminal Tin. When the negative voltage is applied to the input terminal Tin, the dynamic resistance is the sum of the saturation impedance of the first transistor Q1 in a forward mode, and the saturation impedance of the second transistor Q2 in a inverse mode. In order to decrease the saturation impedances of the first and second transistors Q1 and Q2 in a inverse mode, it is necessary to feed enough current to the base to saturate the transistors Q1 and Q2.

The switching circuit SW1 is operable by a single power source 27 and can switch the positive and negative signals applied to the input terminal Tin.

As described above, the switching circuit SW1, when it is in an OFF state, must have an enough withstand voltage to withstand an AC bias signal output from the bias oscillator 13. When it is in an ON state, the switching circuit SW1 must have only a small amount of dynamic resistance between the input terminal Tin and the reference voltage terminal Tref. Particularly, the resistance must be much smaller than the resistance R1 which is a signal source impedance. Generally, as the withstand voltage of the transistor increases, the dynamic resistance of the transistor also increases. The conventional solution to this contradictory relation between the withstand voltage and the dynamic resistance to the transistor, is to increase the emitter area of the transistor. Also in the present invention, to achieve the same contradictory objectives, it is effective to increase the emitter areas of the transistors Q1 and Q2. However, the emitter area of each transistor is increased, the element areas occupied by the integrated transistors are also increased. Any increase in the emitter areas is necessarily limited when one considers the limited chip size, the improvement of integration density, the economic factors, and the like. To solve this dilemma, it is necessary to obtain at the same time a maximum withstand voltage and a minimum dynamic reistance, while the sum of the element areas of the transistors Q1 and Q2 in the semiconductor chip is set at an allowable fixed value.

To this end, in the present invention, the emitter area of the transistor Q2 is larger than that of the first transistor Q1. This is done in order that when the transistors Q1 and Q2 are both in ON state, the dynamic resistance of the second transistor Q1 is equal to that of the second transistor Q2. More specifically, the sum of the element areas of the transistors Q1 and Q2 is kept at an allowable fixed value. The emitter areas of the transistors Q1 and Q2 are adjusted so that the former is smaller than the latter to make the dynamic resistances of the transistors Q1 and Q2 substantially equal to each other. The adjustment of the emitter areas of the transistors must be made allowing for the current values supplied to the bases of the transistors Q1 and Q2, and the current values of the signal to be switched.

In the embodiment of FIG. 5, the emitter area of the second transistor Q2 is two times that of the first transistor Q1. As recalled, the dynamic resistance must be low when the switching circuit is ON state. To realize this, it is necessary to feed enough base current to saturate the transistors Q1 and Q2 in a inverse mode. Under this condition, the base currents $I_{B1}$ and $I_{B2}$ of the transistors are not negligible with respect to a input current Iin.

It is assumed that the transistors Q3 and Q4 have equal characteristics, and that the resistors R11 and R12 have equal resistances. Based on this assumption and on equations (2) to (4), the base currents $I_{B1}$ and $I_{B2}$ are equal to each other. Accordingly, a current $I_B$+Iin flows through the collector of the first transistor Q1 when the switching circuit is on. In the expression, $I_B$ has the current value of each base current. On the other hand, a current $2I_B$+Iin also flows through the emitter of the second transistor Q2. As for the DC component, the current flowing through the collector of the second transistor Q2 is two times that of the current flowing through the first transistor Q1. To make the dynamic resistances of the transistors Q1 and Q2 equal to each other, the transistor Q2 must have emitter area double that of the first transistor Q1.

To confirm the effects of the present invention, an experiment was conducted under the following conditions:

S1 (emitter area of the first transistor Q1)=187,000 μm²

S2 (emitter area of the second transistor Q2)=360,000 μm²

$I_B$ (value of the base current $I_{B1}$ or $I_{B2}$)=1.2 mA

Ii (input current)=1.0 mA (peak=current)

The experiment showed that the dynamic resistance of the switching circuit when it is in an ON state was approximately 10Ω.

In the above embodiment, the base currents $I_{B1}$ of the first transistor and $I_{B2}$ of the second transistor Q2 are equal to each other, taking the value of $I_B$. The base currents of those transistors are not necessarily equal to each other, if the emitter areas of the first and second transistors Q1 and Q2 are adjusted so that the dynamic resistances of these transistors are equal to each other. Further, the circuits for feeding the base currents to the transistors Q1 and Q2 are not limited to that of the above-mentioned embodiment, but may also be applied to any circuit that can stably feed the current to the bases of the transistors Q1 and Q2. For example, if the fifth and sixth transistors Q5 and Q6 are removed, the control signal input terminal Tc is directly connected to the base of the fourth resistor R14 and the base of the fourth transistor Q4. The third resistor R13 is connected through a forward diode to a node among the terminal Tc, the resistor R14 and the transistor Q4.

What is claimed is:

1. A switching circuit for AC bias signal comprising:
    an input terminal applied with an input signal;
    a first transistor connected at the emitter to said input terminal;
    a second transistor connected at the collector to the collector of said first transistor and having an emitter area larger than that of said first transistor so that a dynamic resistance is substantially equal to that of said first transistor when said first and second transistors are ON state;
    a reference voltage terminal connected to the emitter of said second transistor and applied with a reference voltage;
    a control signal inputting means for inputting a control signal; and
    base current feeding means for feeding a base current to the bases of said first and second transistors according to said control signal input by said inputting means.

2. A switching circuit for AC bias signal according to claim 1, in which said emitter area of said second transistor is substantially two times that of said first transistor, and said base current feeding means feeds substantially equally currents to said first and second transistors.

3. A switching circuit for AC bias signal according to claim 1, in which said base current feeding means further includes a power source terminal supplied with a power voltage, a third transistor for feeding the base current to the base of said first transistor in response to said control signal input by said control signal inputting means, said third transistor being connected at the collector to the base of said first transistor and the emitter thereof applied power source voltage via a resistor, and a fourth transistor for feeding the base current to the base of said second transistor in response to said control signal, said fourth transistor being connected at the collector to the base of said second transistor and at the emitter to said power source terminal via a resistor.

* * * * *